Jan. 3, 1967     L. F. McCORMICK     3,295,421
POSITION CONTROL CIRCUIT
Filed March 16, 1964     2 Sheets-Sheet 1
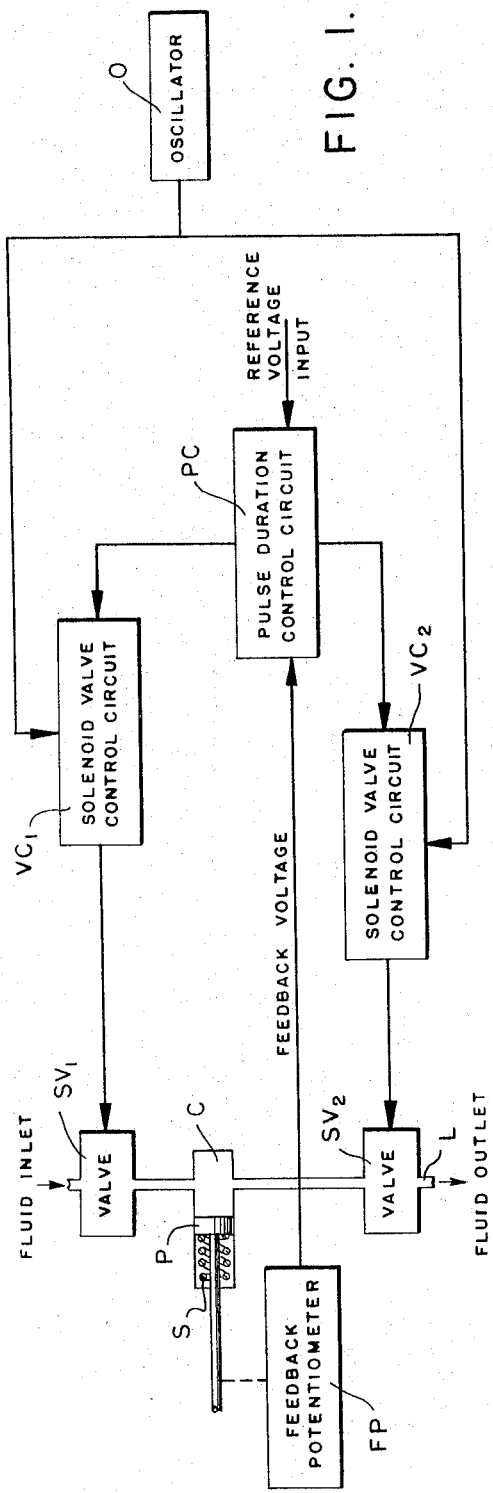
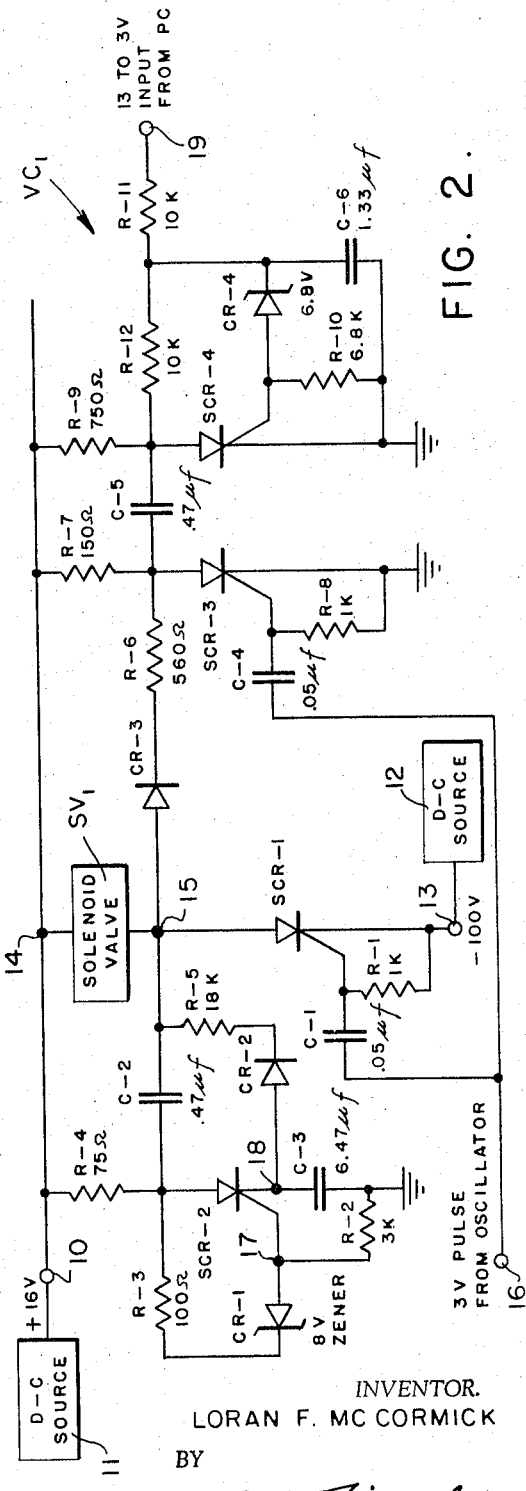
INVENTOR.
LORAN F. MC CORMICK
BY
*P. H. First*
ATTORNEY.

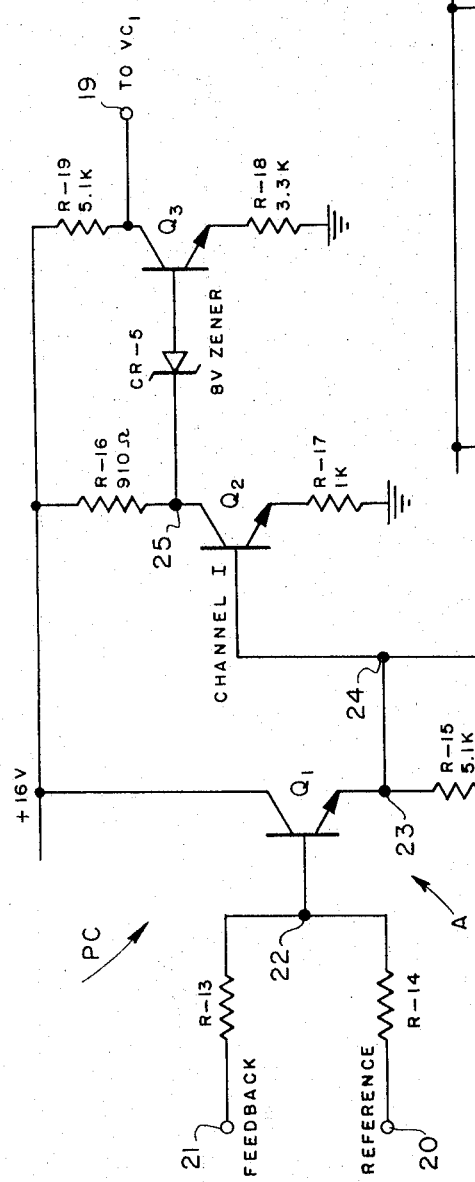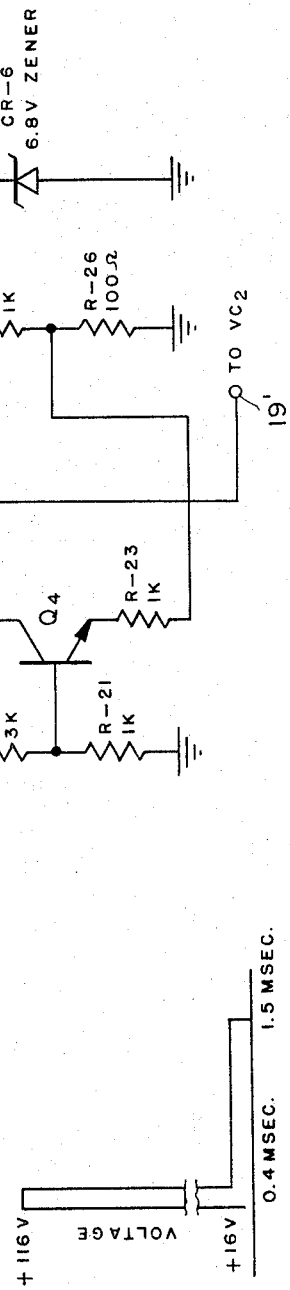

3,295,421
POSITION CONTROL CIRCUIT
Loran F. McCormick, Canoga Park, Calif., assignor to the United States of America as represented by the Secretary of the Navy
Filed Mar. 16, 1964, Ser. No. 352,401
6 Claims. (Cl. 91—363)

The invention described herein may be manufactured and used by or for the Government of the United States of America for governmental purposes without the payment of any royalties thereon or therefor.

The present invention relates generally to improvements in control circuits and more particularly to a rapid response, transistorized control circuit for a hydraulic servo system, wherein duration of pulsed current controls response time for a pair of hydraulic solenoid valves.

One of the more critical problems confronting designers of variable thrust motors has been the lack of practical lightweight servo systems having sufficiently rapid response characteristics.

Various attempts have been made to provide transistorized control circuits for controlling the operations of servo system solenoid valves. However, known control systems have not provided a response rate sufficiently great for meeting the requirements of variable thrust, rocket motor systems, which require an accelerated servo system response.

The general purpose of the instant invention is to provide a control circuit, incorporating a pulse duration control circuit for increasing the rate of response in hydraulic servo position control systems. To attain this, the present invention utilizes a unique circuit including a plurality of silicon control rectifiers, which function as delay multivibrators for providing required short bursts of high voltage for the increasing hydraulic valve opening and closing rates, whereby high resolution control may be achieved through increased valve response and limited hydraulic fluid flow.

An object of the instant invention is to provide means for increasing response characteristics for servo control systems.

Another object is to provide means for imparting an increased repetition rate to solenoid valves in servo control systems.

A further object is to provide a transistorized control circuit capable of providing an electrical pulse having a high-voltage leading portion for opening a selected solenoid valve, and a low-voltage trailing portion for maintaining the selected valve in an opened condition, whereby a rapid closing of the valve may be achieved at pulse termination.

Still another object is to provide a simple control circuit for a hydraulic servo system, which accommodates the use of a high pulse repetition rate for affording increased system control resolution.

Yet another object is to provide a simple control circuit for a hydraulic servo system, which detects system position error and provides an error signal for initiating system position error correction.

Other objects, advantages and novel features of the invention will become apparent from the following detailed description of the invention when considered in conjunction with the accompanying drawings wherein:

FIG. 1 is an over-all diagrammatic view, in block form, of the servo control system of the present invention;

FIG. 2 is a functional diagrammatic view of one of two solenoid valve control multivibrator circuits utilized by the servo control system of FIG. 1;

FIG. 3 is a graphic view illustrating voltage values, as plotted against time in msec. (milliseconds), of a typical pulse applied across a solenoid valve, by the circuit of FIG. 2, for opening and holding the valve open; and FIG. 4 is a functional diagrammatic view of the pulse duration control circuit PC of FIG. 1.

*General description*

Briefly, the control system is provided with a reciprocating hydraulic piston slidingly disposed in a hydraulic cylinder. The cylinder is provided with a hydraulic inlet and an outlet port arranged at one end thereof and a compression spring operatively arranged at the cylinder's other end, so that as fluid under pressure flows through a first solenoid valve, and the inlet port, the piston is extended by fluid pressures, and as the fluid is caused to leave the cylinder, through the outlet port and a second solenoid valve, the piston is retracted under the influences of recovery forces within the compression spring. Hence, by controlling fluid flow to-and-from the cylinder positioning of the piston can be accurately regulated. Operation of each of the aforementioned valves is controlled through high-voltage, pulsed current applied by a circuit employing two SCR (silicon control rectifier) delay multivibrators. A valve-open condition is established and then maintained by the pulsed current with the pulse width determining duration for the valve-open condition. The width of each pulse, as it is applied to a solenoid valve, is dictated by a pulse duration control circuit. The pulse duration control circuit detects piston position error, through a potentiometer, and provides a complementary error signal for controlling pulse width and serves to direct the pulse to a proper one of the solenoid valve control circuits, whereby the fluid flow may be regulated and the piston extended or retracted to a preselected or control position.

Referring now to the drawings, wherein like reference characters designate like or corresponding parts throughout the several views, there is shown in FIG. 1 a block diagram illustrating the aforementioned control system. A hydraulic line L serves to direct a suitable fluid, which may comprise any one of the well-known hydraulic fluids, to and from a hydraulic cylinder C for forceably extending a piston P against a compression spring S arranged adjacent the piston in a manner such as to oppose piston extension. Fluid flowing to the cylinder is controlled or regulated by a first solenoid valve $SV_1$, while fluid flowing from the cylinder is regulated by a second solenoid valve $SV_2$. The valves $SV_1$ and $SV_2$ are selectively operated so that they may be maintained concurrently closed, or maintained alternately opened and closed, whereby a desired fluid pressure may be established and/or maintained within the cylinder C.

Each of the solenoid valves $SV_1$ and $SV_2$, is controlled by one of a pair of solenoid valve control circuits, designated $VC_1$ and $VC_2$, respectively, which may provide a plurality of pulses having leading portions of 116 volts when desired, and, trailing portions of 16 volts, as dictated by the pulse duration control circuit PC. An oscillator O, of any suitable design, serves to repetitiously provide pulse initiating signals to the circuits $VC_1$ and $VC_2$.

Due to response characteristics of the servo system, the oscillator O may be caused to establish a pulse repetition rate approaching 200 c.p.s. (cycles per second), which rate inherently enhances control resolution in a manner as will hereinafter be more clearly understood.

*Solenoid valve control circuit*

Turning now to FIG. 2, there is illustrated one of the two solenoid valve control circuits $VC_1$ and $VC_2$. As the two solenoid valve control circuits $VC_1$ and $VC_2$ are of similar design and are caused to function in similar manner, a detailed description of one of the circuits, circuit $VC_1$, is deemed sufficient to provide an understanding of the instant invention.

The circuit $VC_1$ is connected at a positive terminal 10 to a D.-C. (direct current) source of potential 11. The source 11 is of any suitable design which is capable of providing a positive 16 volt D.-C. input voltage to the circuit $VC_1$. A negative 100 volt source of potential 12 is connected at a junction terminal 13. The circuit is arranged in a manner such as to connect the solenoid valve $SV_1$ within the circuit, at junctions 14 and 15, between the sources 11 and 12, so that a pulse having a voltage value of 116 volts may selectively be imposed across the valve $SV_1$ when a circuit is completed between the voltage sources.

A first SCR delay multivibrator includes a silicon control rectifier SCR-1 which is connected between the source 12 and junction terminal 15 for completing the circuit between the sources 11 and 12. The gate of SCR-1 is connected with the negative source of potential 12 through a one kilohm resistor R-1 for biasing SCR-1 to a nonconductive condition, and connected with a positive oscillator input terminal 16 through a .05 microfarad capacitor C-1, whereby an electrical signal of +3 volts applied at terminal 16 serves to bias SCR-1 to a conductive state so that a voltage of 116 volts may be applied across the valve $SV_1$.

The solenoid valve $SV_1$ may be of any suitable design, however, the valve presently utilized is of a type capable of being opened to a fully opened condition within 1.5 milliseconds with 28 volts applied thereacross. However, when a 116 volt potential is imposed across the valve, the valve opens to a fully opened condition within .4 millisecond. As it is extremely important to accommodate a substantially instantaneous closing of the valve $SV_1$, after it has passed sufficient fluid to cylinder C, means are provided for reducing the voltage drop across the valve to 16 volts for affording a rapid closing of the valve, while being of a value sufficiently great for retaining the valve in an open condition throughout a selected period.

Hence, it is to be understood that a pulse of a configuration having a leading portion of 116 volts, for .4 millisecond, and a trailing portion of 16 volts, FIG. 3, is to be applied across the solenoid valve $SV_1$ for an appropriate period of time, so that at a determinable instant the voltage drop may be reduced to zero volts for thus initiating a substantially instantaneous closing of the valve.

The first delay multivibrator is also provided with a second silicon control rectifier SCR-2 for the purpose of "switching" SCR-1 off and is incorporated within the circuit with its anode connected to the terminal junction 15 through a .47 microfarad capacitor C-2. The gate of SCR-2 is connected to ground potential through a 3 kilohm resistor R-2 at a junction terminal 17 for biasing SCR-2 to a nonconductive state. The gate is further connected to the terminal junction 15 through the capacitor C-2, a Zener diode CR-1, having an avalanche voltage of 8 volts and being connected at the terminal 17, and a circuit series connected 100 ohm resistor R-3 disposed therebetween. A 75 ohm resistor R-4 is connected between the source 11 and the anode of SCR-2 and is so connected with the capacitor C-2 as to permit the capacitor C-2 to be charged through the resistor R-4. The cathode of SCR-2 is connected at a terminal 18 to ground potential across a capacitor C-3 and to terminal 15 through a unilaterally conducting diode CR-2 and an 18 kilohm resistor R-5. The capacitor C-3 serves to prevent this stage of the circuit from drawing current for a longer time than is necessary.

Now, in order to apply the 116 volt portion of the pulse across the valve $SV_1$, an initiating +3 volt pulse is obtained from the oscillator O and is applied at the terminal 16, and consequently to the gate of SCR-1 through the capacitor C-1. This pulse serves to "switch" SCR-1 to a conductive state for thus applying 116 volts across the valve $SV_1$ and initiating an opening thereof. The negative 100 volts from source 12 is also applied to the anode of SCR-2 through capacitor C-2. As the capacitor C-2 charges through resistor R-4 the trigger potential of SCR-2, which is determined by R-3, CR-1, and $R_2$, also rises. When this trigger potential becomes a sufficiently positive voltage, SCR-2 switches on, for thus initiating a discharge of the capacitor C-2 through SCR-2 and capacitor C-3 for interrupting the current flow through SCR-1. SCR-2 thus serves to switch SCR-1 to an off condition. As the discharge current through capacitor C-3 decreases, the current drops below its "holding" value and SCR-2 switches off. In this manner 116 volts may be applied to the solenoid valve $SV_1$ for only 0.4 millisecond, as determined by the circuit components' reaction time, at which time the valve becomes fully opened.

It is to be understood that the duration of the 116 volt pulse applied across valve $SV_1$ is directly controlled by the rate at which capacitor C-2 charges through R-4. Thus the 116 volt pulse duration can be increased or decreased by selectively varying the values of the capacitor C-2 and resistor R-4.

When silicon control rectifier SCR-1 is switched off, after valve $SV_1$ is rapidly and fully opened through an application of high voltage, the voltage across the valve must be prevented from dropping to zero in order that the valve may be maintained in its opened condition. In the absence of such means, the valve will be caused to close. However, since it is necessary for the valve to be maintained in its opened state for a determinable period and then closed with minimum time loss, the circuit is provided with means for applying a 16 volt potential across the valve for a desired period to thus provide the aforementioned low-voltage trailing portion for the valve applied pulse.

A second SCR delay multivibrator includes a third silicon control rectifier SCR-3 connected between ground potential and junction terminal 15 for establishing a 16 volt voltage level for the trailing portion of the valve applied pulse. The anode of SCR-3 is connected to terminal 15, through a 560 ohm resistor R-6 and a unilaterally conducting diode CR-3, and to the source 11 through a 150 ohm resistor R-7 which allows SCR-3 to conduct while CR-3 is back-biased during the 116 volt pulse. The cathode of SCR-3 is connected directly to ground potential with its gate being connected to ground potential through a one kilohm resistor R-8. Also, the gate of SCR-3 is connected to the terminal 16 through a .05 microfarad capacitor C-4.

Therefore, it is to be understood that when an initiating pulse is applied to the terminal 16, from the oscillator O, it is applied through the capacitor C-4 to the gate of SCR-3, simultaneously with its application to the gate of SCR-1 through capacitor C-1. The initiating pulse thus serves to switch SCR-3 to a conducting state. Once SCR-3 is switched on, it continues to conduct, by drawing a holding current through R-7 and, after SCR-1 is turned off, completes a circuit to ground from terminal 15, with the current through R-6 being limited to a minimum value for holding the valve open, thus permitting a voltage of 16 volts to be maintained across the solenoid valve $SV_1$.

When the voltage drop across valve $SV_1$ is to be reduced to a zero level, for allowing the valve to close, the holding current through SCR-3 must be interrupted. This is accomplished by a fourth silicon control rectifier SCR-4 included in the second delay multivibrator, the anode of SCR-4 being connected to the anode of SCR-3 through a .47 microfarad capacitor C-5. A 750 ohm resistor R-9 is connected between the source 11 and the anode of SCR-4 to provide a minimum current and positive voltage thereto. The cathode of SCR-4 is connected directly to ground potential, while its gate is connected to ground through a 6.8 kilohm resistor R-10. The gate of SCR-4 is also connected to a 10 kilohm output resistor R-11, through a Zener diode CR-4 having an avalanche voltage of 6.8 volts. Connected to the circuit between CR-4 and R-11, is one side of 1.33 microfarad capacitor C-6, the other side of which is connected to junction with the grounded end of resistor R-10. A resistor R-12 is connected at one end between the anode of SCR-4 and resistor R-9 and at the other end between resistor R-11 and Zener diode CR-4 and capacitor C-6.

With SCR-4 thus connected, it is to be understood that it normally draws a holding current through R-9 only while SCR-3 is in a non-conductive state. However, when SCR-3 is switched on, by the initiating pulse applied from terminal 16, the voltage across capacitor C-5 causes a drop in the anode voltage of SCR-4 which results in SCR-4 being switched off.

Once SCR-4 is switched off, it remains off until a voltage is obtained through resistor R-11 as an output voltage or pulse duration control signal from the pulse duration circuit PC. When a pulse duration control signal is applied at terminal 19, the capacitor C-6 begins to charge at a rate determined by the magnitude of the voltage level of the output from the pulse duration control circuit. A pulse duration control signal of +13 volts charges the capacitor C-6 at a maximum rate, thus producing a minimum period during which SCR-4 will remain nonconductive, or approximately .5 millisecond. A pulse duration control signal of +3 volts charges the capacitor C-6 at a minimum rate thus producing a maximum period, approximately 1.5 milliseconds, during which period the SCR-4 will remain nonconductive. This result is achieved due to the fact that the pulse duration control signal acts as a trigger voltage for SCR-4. When the voltage drop across the Zener diode CR-4 reaches 6.8 volts, or avalanche voltage, SCR-4 is switched on. As SCR-4 is switched on the current through SCR-3 is interrupted, through a negative charging of the capacitor C-5, thus causing SCR-3 to be switched off for thus terminating the 16 volt trailing portion of the pulse applied across the solenoid valve $SV_1$. Since the voltage level of the pulse across the valve, at this time, is 16 volts, or slightly less, the valve may be closed in a substantially instantaneous manner.

Once SCR-3 is switched off, SCR-4 remains on until another initiating pulse is applied to the gate of SCR-3, whereupon SCR-3 is switched on and SCR-4 is switched off to remain off until the capacitor C-6 is again charged by an output voltage or signal obtained from the pulse duration control circuit PC.

Since the charging rate of the capacitor C-6 depends directly upon the voltage level of the pulse duration control signal, it is to be understood that the period of time the solenoid valve $SV_1$ remains open to pass hydraulic fluid to cylinder C, for displacing the piston P, is directly related to the magnitude of the voltage obtained from the pulse duration control circuit PC and the value of capacitor C-6. Therefore, when the voltage values applied at terminal 19 are varied, a variation in piston displacement is experienced.

*Pulse duration control circuit*

The pulse duration control circuit PC includes a pair of voltage averaging resistors R-13 and R-14, FIG. 4, which functions to average a piston driven potentiometer feedback voltage with an applied reference voltage so that piston position error may be represented as an error signal and provided as an input to the pulse duration control circuit PC.

The feedback potentiometer FP, FIG. 1, is of any suitable design which permits the contact arm thereof to be displaced extensively and concurrently with piston displacement. As such devices are well-known, a detailed description thereof is not deemed necessary to an understanding of the invention. It suffices to understand that a predetermined voltage output is obtainable when the piston is in a "control," or neutral position, wherein it is not necessary to either extend or retract the piston in order for it to perform a control function. If the piston P is now displaced, viz., extended or retracted, the feedback voltage is raised or lowered accordingly, from the predetermined positive value coextensively with piston displacement, due to a simultaneous displacement being imparted to the contact arm of the potentiometer FP as the piston is extended or retracted.

The reference voltage is obtained from any suitable source and is applied at terminal 20, while the feedback voltage is applied at terminal 21, the feedback voltage being averaged with the reference voltage by resistors R-13 and R-14 to provide an input at terimnal 22 to an impedance matching stage A comprising an NPN transistor $Q_1$.

In one application of the position control circuit of the present invention, piston P may be operatively connected by any suitable means (not shown) to a flow control valve in a variable thrust rocket motor (not shown) for controlling the flow of hypergolic fluids into the nozzle of the motor, thereby controlling the thrust of the motor. Thus, the position of the piston P may be utilized to determine the setting of the flow control valve and dictate the thrust developed by the motor. In turn, the position of the piston P is dictated by the reference voltage applied to terminal 20. Such voltage may be variably applied through the medium of a potentiometer of any suitable design having the usual movable contact which is operatively connected to control means actuable at the option of an operator. The control means may be calibrated for selective setting thereof and application of a predetermined reference voltage to obtain the motor thrust desired. When the control means is reset to a different setting, a new reference voltage is applied which, when averaged with the feedback voltage of the piston P, provides an input at terminal 22 of a nature to activate the pulse duration control circuit PC and solenoid valve control circuits $VC_1$ and $VC_2$ which, in turn, actuate valves $SV_1$ and $SV_2$ in a manner to displace the piston to a new "control" or balanced position. It is to be understood that the foregoing example of the use of this position control circuit of the present inevntion is illustrative only and not limiting since other ways of applying the reference voltage may be utilized and other uses made of the circuit for control purposes.

With the parameters chosen for one embodiment of the present invention herein described, the input to transistor $Q_1$, that is, the averaged feedback and reference voltages, has a value of +5 volts when the piston P is in a control or balanced position. At this value, output signals, each having a value of about +13 volts, are provided from the pulse duration circuit PC to the solenoid valve control circuits $VC_1$ and $VC_2$, as will hereinafter be more fully understood. However, when the reference voltage is caused to change and the average voltage applied at terminal 22 rises above or drops below the +5 volt level, an error signal is produced having a voltage value indicative of the piston position error.

The collector of transistor $Q_1$ is arranged within the circuit PC so as to have a potential of +16 volts constantly applied thereto, while its emitter is connected to ground through a 5.1 kilohm resistor R-15 and its base is connected with the input terminal 22. Connected to a terminal 23, disposed between the emitter of $Q_1$ and the resistor R-15, is a terminal 24 common to the bases of a pair of NPN transistors $Q_2$ and $Q_4$, each being respectively disposed in a pair of circuit channels I and II. The voltage values obtainable at terminals 23 and 24 vary from zero to +10 volts as the transistor $Q_1$ becomes forward biased under the influence of the positive voltage signal applied to its base from terminal 22. It is intended that signals having voltage values ranging between zero and +5 volts, as applied at terminal 24, serve as an input to be directed through channel I, while signals having voltage values ranging between +5 and +10 volts serve as an input to be directed through channel II.

Channel I comprises NPN transistors $Q_2$ and $Q_3$, transistor $Q_2$ being so arranged as to have its collector connected through a 910 ohm resistor R–16 to the +16 volt source 11 and its emitter connected to ground potential through a one kilohm resistor R–17. Connected at a terminal 25, disposed between resistor R–16 and the collector $Q_2$, is a Zener diode CR–5 having an avalanche voltage of +8 volts, which serves to conduct a current through R–16 to the base of the transistor $Q_3$ of channel I. Transistor $Q_3$ is so arranged as to have its emitter connected with ground potential through 3.3 kilohm resistor R–18 and its collector connected with the source 11 through a 5.1 kilohm resistor R–19. The channel's output terminal 19 is conected between the collector of $Q_3$ and the resistor R–19, and serves as the input terminal for the solenoid valve control circuit $VC_1$. Hence, it is to be understood that when the potential at terminal 24 is at a +5 volt level, transistor $Q_2$ is forward biased and conducting and the output at terminal 25 is slightly greater than +8 volts so that transistor $Q_3$ is conducting lightly and there is a voltage drop across resistor R–19 of about 3 volts, thus providing a maximum output voltage of about +13 volts at terminal 19 to the circuit $VC_1$. However, as the voltage value at terminal 24 drops below +5 volts, $Q_2$ becomes less conductive and the output at terminal 25 increases and $Q_3$ conducts heavily and the voltage drop across resistor R–19 increases to about 13 volts, resulting in a minimum voltage of about +3 volts being provided at terminal 19 as an input signal for the solenoid valve control circuit $VC_1$.

Channel II includes the transistor $Q_4$, the base of which is connected with terminal 24 through a 3 kilohm resistor R–20 and to ground potential through a one kilohm resistor R–21. The collector of $Q_4$ is connected to the +16 volt source 11 through an 8.2 kilohm resistor R–22. The emitter of $Q_4$ is connected through one kilohm resistor R–23 to a voltage divider network comprising resistors R–24 and R–26. Connected in series between the +16 volt source and ground are a 1.2 kilohm resistor R–25 and a Zener diode CR–6 having an avalanche voltage of 6.8 volts. One end of the voltage divider network R–24, R–26 is connected to ground and the other end is connected to the junction between resistor R–25 and Zener diode CR–6. The output of channel II is taken off a terminal 19' which is connected between resistor R–22 and the collector of $Q_4$ and serves as the input terminal to the solenoid valve control circuit $VC_2$. Hence, it is to be understood that when any signal having a voltage value of +5 volts or less is applied to terminal 24, transistor $Q_4$ is essentially cut off so that the voltage drop across resistor R–22 is small and the voltage value at output terminal 19' remains at a maximum, or about +13 volts. However, as the voltage value at terminal 24 rises above +5 volts, $Q_4$ becomes forward biased and conducts, the voltage drop across R–22 increases, and the output at terminal 19' drops. When the input at terminal 24 is raised to +10 volts, the output at terminal 19' is reduced to a minimum potential level of about +3 volts.

*Summary*

It is to be understood that when the piston P is in a control or balanced position, the feedback voltage is averaged with the reference voltage to provide a +5 volt potential at terminal 24, which causes a maximum potential of about +13 volts to be applied at terminals 19 and 19', whereby both solenoid control valves $SV_1$ and $SV_2$ are maintained in a continuously and simultaneously opening and closing state under the influence of pulses from the oscillator O. However, when the reference voltage is altered, the averaged voltage is altered accordingly, thus causing a voltage variance to occur at terminal 24. The resulting effect is that the voltage value of the output from the pulse duration control circuit PC is lowered at one or the other of the two terminals 19 and 19', while being maintained constant at the other. When a pulse from the oscillator O is applied at the terminals 16 of the solenoid valve control circuits $VC_1$ and $VC_2$, the circuits are activated causing both valves $SV_1$ and $SV_2$ to open, however, the circuit having the lower voltage input applied from the pulse duration control circuit PC is activated to provide a pulse of increased width across that circuit's solenoid valve for causing the valve to be held open through a period of time dictated by the charging time of the circuit's capacitor C–6, while the other valve is allowed to close. That is, should the applied reference voltage be changed so that the averaged voltage input at terminal 24 is between +5 and 0 volts, the valve control circuit $VC_1$ is activated so that its valve $SV_1$ is opened to allow more pressurized fluid to pass the valve into cylinder C, while the circuit $VC_2$ remains substantially inactivated with its valve $SV_2$ first opening, then immediately closing, and remaining closed until another oscillator pulse is applied, with consequent displacement of the piston P. However, should the averaged voltage input applied at terminal 24 be between +5 and +10 volts, the valve $SV_2$ is opened and then held open, while the valve $SV_1$ is first opened and then immediately closed and maintained closed until another oscillator pulse is applied so that fluid may flow from the cylinder C and the spring S displaces the piston P. In either event the piston P is displaced in a direction such that the feedback voltage from potentiometer FP changes toward a final value which averaged with the applied reference voltage gives an averaged voltage of +5 volts and the piston is positioned in a new control or balanced position until such time as a different reference voltage is applied at terminal 20.

Hence, it is to be understood that the amount of fluid in the cylinder C is directly controlled by the open periods imposed on the solenoid valves, which are pulsed open at a constant repetition rate. When more fluid is required, the valve $SV_1$ of circuit $VC_1$ remains open for a longer period than does the valve $SV_2$. If less fluid is required the valve $SV_2$ remains open for the longer period. There is thus provided a simple, compact, and rapid response control circuit through which high resolution valve control may be achieved with a minimum amount of hydraulic fluid.

Obviously many modifications and variations of the present invention are possible in the light of the above teachings. It is therefore to be understood that within the scope of the appended claims the invention may be practiced otherwise than as specifically described.

What is claimed is:

1. A hydraulic control system comprising:
   a fluid displaceable member;
   a member connected fluid flow circuit, including a pair of on-off solenoid valves, each being selectively operable for selectively controlling fluid flow as it passes through said fluid flow circuit;
   a first electrical pulsing circuit connected with a first one of said pair of solenoid valves for applying a first bilevel voltage control pulse thereacross;
   a second electrical pulsing circuit connected with a second one of said pair of solenoid valves for applying a second bilevel voltage control pulse across said second one of said valves simultaneously with the application of said first pulse across said first one of said pair of solenoid valves;
   means interconnected within each of said electrical pulsing circuits for imparting a first voltage level to the leading portion of each of the applied pulses in a simultaneous manner;

further circuit means connected within said pulsing circuits for selectively and independently maintaining a trailing portion of each applied pulse at a second voltage level substantially below the first voltage level; and means including a pulse duration electrical circuit connected with said further circuit means for controlling duration of the trailing portion of each applied pulse, whereby the trailing portion of the first applied bilevel voltage pulse may be maintained at said second voltage level subsequent to a termination of the trailing portion of said second applied bilevel voltage control pulse, and whereby the trailing portion of the second applied pulse may be maintained at a second voltage level subsequent to a termination of the trailing portion of said first applied pulse.

2. The system of claim 1 further including:

a member position error detecting means for providing an error signal when said member is in an undesired position; and means directing said error signal to said pulse duration electrical circuit for selectively providing a control signal to said first and second electrical pulsing circuits in accordance with the member position error.

3. In a control circuit, means including in combination:

a solenoid valve control circuit;

a voltage source having a first positive terminal, a second negative terminal and a third terminal of potential intermediate the first and second terminals connected with said circuit;

an electrically operative solenoid valve connected between said positive and said negative terminals;

a first silicon control rectifier connected in circuit series between said solenoid valve and said negative terminal whereby when said silicon control rectifier becomes forward biased the voltage between said positive and negative terminals is placed across said solenoid valve for initiating an opening thereof;

means including a capacitor and a circuit series connected second silicon control rectifier coupled between said solenoid valve and said first silicon control rectifier for causing said first control rectifier to be reversed biased when said second silicon control rectifier becomes forward biased for opening the circuit between the solenoid valve and said negative terminal;

means responsive to current flow through said first silicon control rectifier for forward biasing said second silicon control rectifier, whereby as said first silicon control rectifier becomes forward biased said second silicon control rectifier responds thereto and subsequently becomes forward biased for opening said circuit to disconnect said negative terminal to thus decrease the voltage across said solenoid valve;

a third silicon control rectifier connected with said circuit normally completing a circuit from said solenoid valve to said third terminal upon a forward biased state being imposed thereon;

a fourth silicon control rectifier connected with said third silicon control rectifier for dictating bias states for said third silicon control rectifier in accordance with its own state of bias; and an initiating pulse applying means commonly connected with said first and said third silicon control rectifiers, whereby said first and said third silicon control rectifiers are simultaneously activated by a common initiating pulse simultaneously applied thereto, and a pulse having a leading portion of a voltage value equal to the voltage between said positive and negative terminals and a trailing portion of a voltage value equal to the voltage between the positive and third terminals is applied across said solenoid valve.

4. In the control circuit of claim 3, further including means comprising:

a fluid activated displaceable member adapted to be operatively actuated and displaced in response to the opening of the valve of said solenoid valve control circuit;

detecting means adapted to be operatively activated by an actuation of said member; and an electrical circuit connected between said detecting means and said fourth silicon control rectifier for determining and dictating the state of bias imposed on said fourth silicon control rectifier.

5. The circuit as defined in claim 4 being further characterized in that the detecting means includes:

a potentiometer having a contact thereof operatively connected with and operatively driven by said fluid activated member to provide a potentiometer feedback voltage in accordance with the position of said member;

a reference voltage applying means for providing a reference voltage; and a voltage averaging means adapted to average the feedback voltage with the reference voltage to establish and provide a circuit input signal having a variable voltage indicative of the displacement of said member.

6. A control system comprising:

a hydraulic chamber;

a reciprocally mounted hydraulic piston having a pressure face disposed in said chamber;

fluid delivering means for delivering fluid under pressure into said chamber for acting on said face to force said piston in a first direction;

resilient means engaging said piston and being adapted for forcing said piston in a second direction;

fluid delivery means for delivering fluid from said chamber;

selectively operable solenoid valve means operatively connected with said fluid delivery means for selectively controlling the delivery of said fluid into and from said chamber;

detecting means operatively connected with said piston and adapted to continuously detect the piston's directional displacement relative to a predetermined position;

control means electrically coupling said detecting means with said valve means for selectively initiating an operation of said valve means for thus dictating the delivery of said fluid in accordance with detected piston displacement;

said control means comprising an electrical circuit including means for initiating a plurality of electrical solenoid valve control pulses, each having a leading portion of a first voltage value and a trailing portion of second voltage value; and means including an electrical circuit adapted to selectively control the time duration of said second portion of each of said pulses.

References Cited by the Examiner

UNITED STATES PATENTS

| 2,494,353 | 1/1950 | Newman | 331—144 |
| 2,778,978 | 1/1957 | Drew | 317—149 X |
| 3,122,683 | 2/1964 | Whitehead. | |
| 3,140,427 | 7/1964 | Freiberg | 317—155.5 |
| 3,190,185 | 6/1965 | Rasmussen | 91—363 |

MARTIN P. SCHWADRON, *Primary Examiner.*

PAUL E. MASLOUSKY, *Examiner.*